United States Patent Office 2,728,428
Patented Dec. 27, 1955

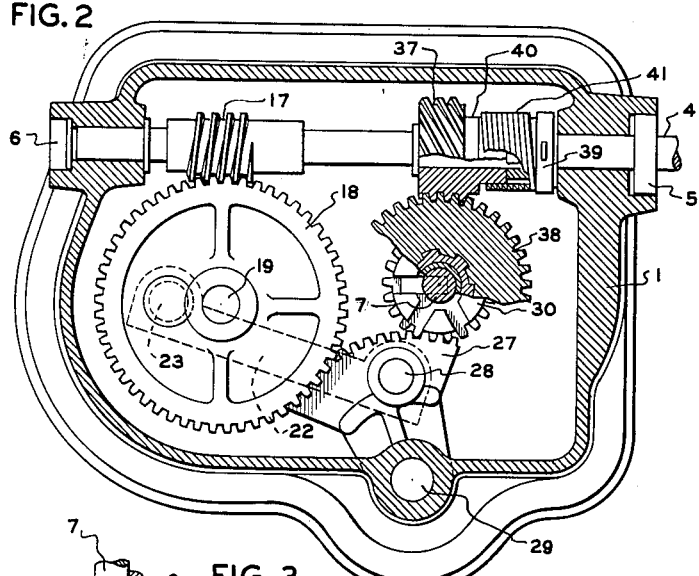

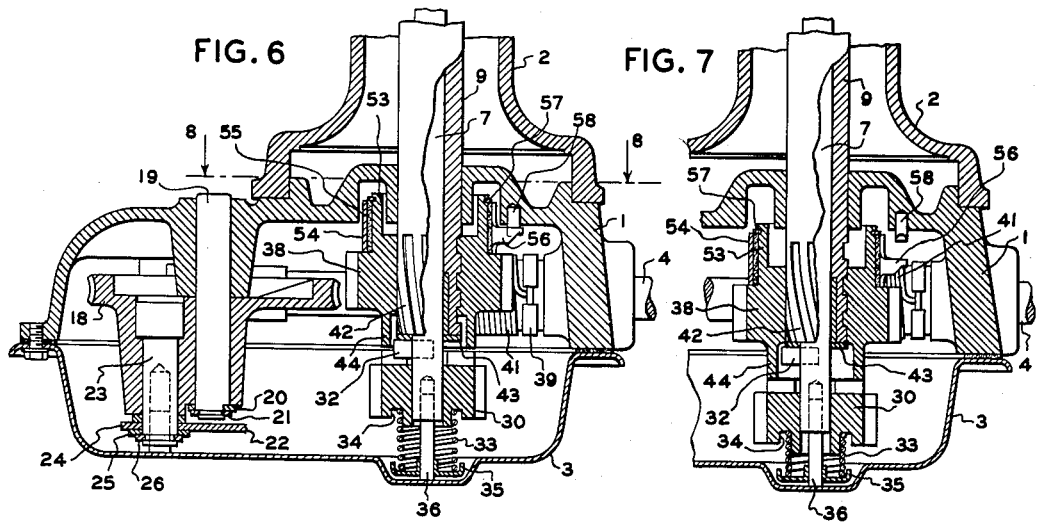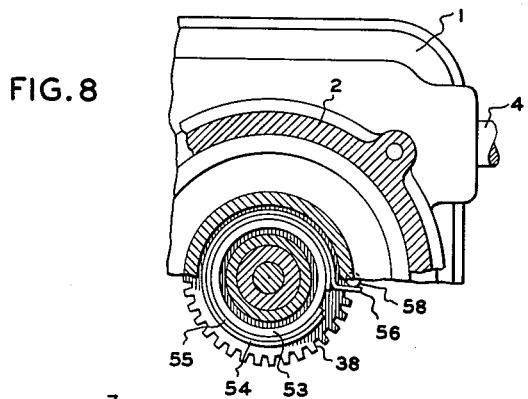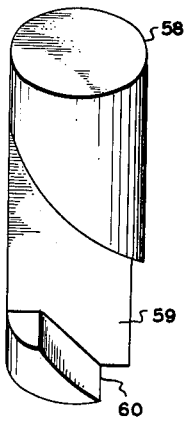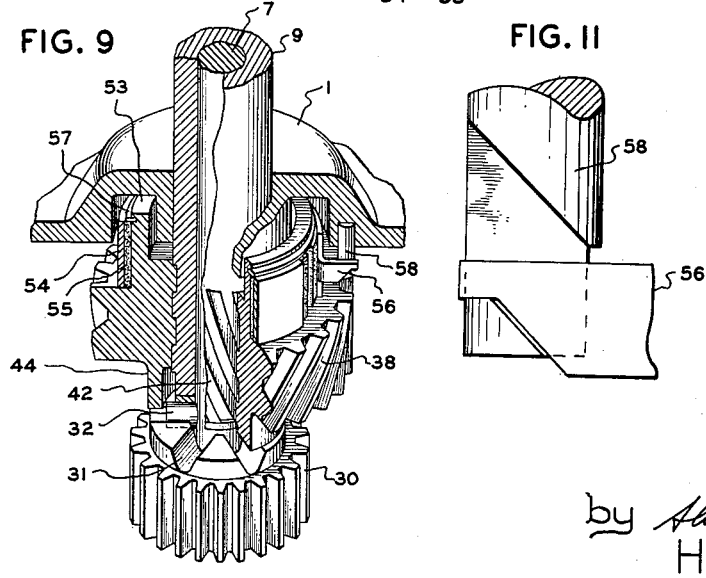

2,728,428

AUTOMATIC TRANSMISSION AND BRAKE FOR CLOTHES WASHERS AND THE LIKE

David Cohen, Louisville, Ky., assignor to General Electric Company, a corporation of New York Application October 12, 1954, Serial No. 461,730

7 Claims. (Cl. 192—4)

This invention relates to drive mechanisms and in particular to an automatic brake for such a mechanism.

In application Serial Number 404,434, filed January 18, 1954, for a "Drive Mechanism for Automatic Washing Machines and the Like" of Carl S. Dayton, now Patent Number 2,720,953, assigned to the General Electric Company, assignee of the present application, a driving mechanism is disclosed and claimed of a type suitable, for example, for an automatic washing machine. This mechanism, from a reversible input drive source, provides automatically a low-speed agitation drive, or a high-speed clothes basket drive dependent upon the direction of input rotation.

The present invention is an improvement on the mechanism disclosed and claimed in the aforesaid Dayton application, and has for one of its primary objectives the provision of an improved automatic brake for the high-speed drive shaft, automatically effective at all times when driving torque is not being transmitted thereto.

A further object of this invention is to provide an automatic brake in connection with a driving shaft functioning to bring the shaft quickly to rest upon termination of input driving torque.

With respect to the application of this invention to mechanisms having a pair of output shafts selectively driven, it is a further object of this invention to provide a brake for one of said output shafts automatically operative during transmission of torque through the other shaft.

In accordance with this invention, an input shaft rotates a high-speed output shaft through a driving member having a torsional connection with the output shaft and providing limited axial movement on the output shaft depending upon the direction of torque transmission. In one of its axial positions, the driving member and output shaft rotate freely and thus can be driven from the power source. The brake for the high speed output shaft includes braking means mounted on this driving member in cooperative relation with stationary braking means on the casing in which the various transmission elements are journaled. Upon termination of input drive from the power source, the driving member moves to its opposite axial position, automatically engaging this brake which functions to restrain further rotation of the driving member and output shaft.

This invention will be better understood by reference to the following description, taken in connection with the accompanying drawings, and its scope will be pointed out with particularity in the appended claims.

In the drawings, Fig. 1 is a cross-sectional elevation, with certain surfaces broken away to illustrate details, through a drive mechanism embodying my invention; Fig. 2 is a cross-sectional view taken on the lines 2—2 of Fig. 1; Fig. 3 is a partial cross-sectional elevation similar to Fig. 1, but with certain components shown in a different operative position; Fig. 4 is a perspective partially sectionalized view through a portion of the mechanism shown by Fig. 1; Fig. 5 is a cross-sectional view taken on the line 5—5 of Fig. 1; Fig. 6 is a partial cross-sectional elevation, similar to Fig. 1, of a modification of this invention; Fig. 7 is a partial cross-sectional elevation similar to Fig. 6, but with certain components in a different operative position; Fig. 8 is a partial cross-sectional view taken on the line 8—8 of Fig. 6; Fig. 9 is a perspective view, partially in section, of a portion of the device shown in the modification of Figs. 6–8; Fig. 10 is an enlarged perspective view of a component; and Fig. 11 is a partial perspective view showing certain components in a different operative position.

In the drawings, I have shown a drive mechanism by way of example as a type adapted for the drive of an automatic clothes washing machine. From a reversible input driving shaft, power output is supplied to an agitation shaft for the washing machine or, selectively, to a centrifugal extraction shaft, dependent upon the direction of input rotation. While in the present application I have not shown any of the details of the washing machine or the adaptation of this transmission to a washing machine, reference is made to the aforesaid Dayton application Serial No. 404,434 of January 18, 1954, now Patent Number 2,720,953 illustrating a transmission of this same general type as applied to an automatic clothes washer and extractor.

In Figs. 1–5, a preferred embodiment of this invention is illustrated. The entire drive mechanism is enclosed within a casing comprising a central or main section 1, an upper section 2, and a lower pan 3 all secured together in any appropriate manner to provide a completely sealed transmission casing into which a quantity of lubricant can be placed. Journaled at spaced locations in the central section 1 is an input driving shaft 4 provided with appropriate oil seals 5 and 6. In accordance with this particular embodiment, two separate output shafts are provided. The inner shaft 7 extends upwardly terminating in a drive block 8 adjacent the upper end thereof; and in a washing machine application as shown by the aforementioned Dayton application, a drive is thus provided to the agitation means (not shown). Co-axial with shaft 7 is an outer tube or shaft 9, for example as a drive means for a centrifugal extractor basket (not shown), with a basket hub 10 secured thereto by appropriate fastening means 11. It is to be understood, of course, that the inside shaft 7 is journaled within the outer tube so that both shafts may rotate independently. The outer shaft is supported with respect to the casing assembly by an upper thrust bearing 12 and a lower sleeve bearing 13 forming a part of central casing section 1. As clearly shown by Fig. 1, thrust bearing 12, of the anti-friction type, is positioned within an annular recess in section 2 of the casing and is held in position by pins 14 and 15. In the usual manner, an appropriate oil seal 16 should be employed at the upper end of the casing to prevent entrance of moisture and foreign material and loss of lubricant.

In Fig. 1, the components are shown in the position occupied with the drive to inner shaft 7. This drive is accomplished through a worm 17 and worm wheel 18, the worm being appropriately secured to shaft 4 (Fig. 2). Worm wheel 18 is journaled on a shaft 19 secured in the central section of the casing with retaining means for the worm wheel in the form of a bearing washer 20 and retainer 21. The worm wheel thus is rotated constantly whenever the input driving shaft 4 is rotating. In the present embodiment, the drive to the inner shaft 7 is arranged to provide oscillatory or to and fro rotational movement thereof. Therefore, a drive link 22 is eccentrically connected to worm wheel 18 on a journal pin 23 with bearing washers 24 and 25 on either side of the link, the assembly being secured in the desired axial position by a spring retainer 26. As shown more clearly in Fig. 2, link 22 has its opposite end eccentrically connected to a gear 27, shown in the form of a sector gear. The pivotal connection to this sector gear may be accomplished in a similar manner with a journal pin 28. The sector gear is, of course, journaled with respect to the casing on a pin 29. Meshing with the sector gear is the drive member 30 for the inner shaft, referred to in a washing machine application as the agitator drive pinion. Obviously, this drive member could take on other forms. With this construction, rotation of the input driving shaft drives pinion 30 with an oscillatory motion.

The driving connection between pinion 30 and inner shaft 7 is accomplished through an appropriate clutch. While this clutch may be one of several different forms, I have shown a preferred type herein which is engaged by axial upward movement of pinion 30 on shaft 7. As shown quite clearly by Fig. 4, pinion 30 has a plurality of grooves 31 milled in its upper surface of an appropriate size and shape to receive a laterally projecting pin 32 in output shaft 7. Thus, as pinion 30 is raised, under the influence of a biasing spring 33, a driving connection is completed to output shaft 7. As shown in Fig. 1, the biasing means or spring 33 has its upper end engaged in an annular groove 34 on the underside of the pinion, with the lower end of the spring resting in a cup 35, the arrangement being further stabilized by the use of a guide pin 36.

The drive from input shaft 4 to the output shaft or tube 9 is accomplished by means including a spiral driving gear 37 mating with a spiral driven gear 38. One of the requirements in the drive mechanism of the illustrated type is that the drive to shaft 7 or 9 is independently selective, dependent upon the direction of input rotation. Correspondingly, in the drive connection to the high speed shaft 9 is a clutch, here shown as a spring type friction clutch between the input shaft and spiral driving gear 37. This clutch consists of a hub 39 keyed to the input driving shaft and a coaxial hub 40 on spiral driving gear 37 (Fig. 2). The spring clutch member 41 is secured to hub 39 and encircles the hub 40 of gear 37. Upon one direction of rotation, spring clutch 41 tends to unwind, and hence substantially no driving torque is transmitted to gear 37; while on the other direction of rotation of the input shaft, spring 41 tightens about hub 40 thereby providing an efficient drive.

The driving connection between spiral driven gear 38 and the shaft 9 is accomplished through a torsional connection which results in limited axial movement of gear 38 on tube 9 responsive to the direction of torque transmission. As clearly shown by the drawings, this may be accomplished by means of an inclined or spiral spline 42 on the lower end of tube 9 mating with a corresponding internal spline in gear 38. The direction of incline of this spline is such that when torque is transmitted through spring clutch 41 to gear 38, gear 38 moves downwardly on this spline until the axial motion is arrested by abutment of the hub portion of the gear with a thrust washer 43 resting against the projecting pin 32 (see Fig. 1). Thereafter, gear 38 is effective to transmit torque to tube 9, for example for centrifugal extraction purposes in a washing machine application. Gears 37 and 38 are, of course, so arranged that they remain permanently in mesh throughout the range of axial movement of gear 38.

This same downward motion of gear 38 during torque transmission to tube 9 is effective to disengage the clutch means between driving member 30 and shaft 7. This may be accomplished by forming gear 38 with an annular downwardly projecting flange 44 of sufficient internal diameter to clear drive pin 32 in shaft 7. Thus, as gear 38 moves downwardly, the annular flange 44 engages the upper portion of pinion 30 to force it downwardly and compress spring 33 to the position shown by Fig. 3. If desired, means may be employed for retaining pinion 30 in its lower position with its drive clutch disengaged, such arrangements being disclosed and claimed in the aforementioned Dayton application Serial No. 404,434, now Patent Number 2,720,953, or in accordance with the alternate construction disclosed and claimed by the co-pending application of Max J. Loehle, Serial No. 465,011, filed October 27, 1954, for Drive Mechanism for Automatic Washing Machines and the Like, assigned to the General Electric Company, assignee of the instant application.

This invention is directed in particular to the braking means by which the output shaft 9 may be brought to rest following a termination of input driving torque thereto. In accordance with the embodiment of Figs. 1–5, two braking elements are employed. The first braking element is shown as a band brake consisting of an annular spring band 45 compressing a correspondingly shaped band of friction producing material or brake band lining 46 into contact with a hub 47 formed on the central section 1 of the casing. Brake band 45 includes an outwardly projecting tab 48 thereon, as clearly shown by Figs. 4 and 5. This projecting tab is adapted to be engaged by an inwardly projecting lug 49 formed internally on the upper hub portion of spiral driven gear 38. As gear 38 rises on the inclined spline, responsive to termination of input driving torque and the inertia effects by which tube 9 becomes the driving member, lug 49 engages with the outwardly projecting tab 48 on the brake band, thereby providing an initial braking force and encouraging further upward rise of gear 38 on its inclined spline connection to the tube. It may also be noted in this connection that this braking means is self-energizing in that the relative directions of rotation are such to aid in further compression of the brake band when the braking action is initiated.

The second braking means shown by Figs. 1–5 is provided in the form of a cone brake. This arrangement as illustrated comprises a conical braking surface 50 formed on the central section 1 of the casing, adapted to be engaged by a mating conical braking surface 51 with brake lining 52 on the upper portion of gear 38. Thus, as gear 38 commences to rise following a termination of driving torque, the brake tab is first engaged by lug 49, whereupon the upward movement of gear 38 continues with even more force to compress brake lining 52 into contact with braking surface 50 of the stationary casing. By this arrangement, shaft 9 may be brought to rest within a relatively short time, even though it may be rotating at a high speed and in spite of the fact that there may be substantial inertia in the load rotating with shaft 9.

In operation of the arrangement as shown by Figs. 1–5, when the input driving shaft rotates in a first direction, during which spring clutch 41 overruns, a drive is provided from worm 17 through worm wheel 18, eccentrically connected link 22, sector gear 27, to the driving member 30, which is clutched to the inside shaft 7. When it is desired to drive the outer shaft, the direction of input rotation is reversed, whereupon the spring clutch 41 engages to rotate spiral driving gear 37, thereby driving the spiral driven gear 38. Gear 38 through its torsional connection to the outer shaft moves axially downwardly to disengage the clutch connection to the inner shaft, and at the same time to disengage any braking connection which might exist. Upon termination of the input drive to the outer shaft through this gear train and clutch assembly, the spiral driven gear 38 rises picking up first the brake tab on the hub of the casing. This initial braking force aids in the engagement of the cone type brake, thereby bringing the outer shaft to rest in a relatively short period of time.

Referring now to the modification of Figs. 6–11, many of the components are the same as those previously described, and hence common reference numerals have been used to the extent applicable. Referring to these figures, the input driving shaft 4 again provides a drive selectively to one of the two output shafts 7 and 9. The drive to the inner shaft, as previously described, includes a drive to a worm wheel 18, which through an eccentrically connected link 22 may provide an oscillatory drive to the member or pinion 30. Pinion 30 through the clutching slots 31 in engagement with the drive pin 32 accomplishes the drive to inner shaft 7. Also as previously described, the drive to the outer shaft occurs through the spring clutch 41, and a gear train ending with the driven gear 38. Again, gear 38 drives its shaft 9 through a torsional connection including spline 42, permitting gear 38 to move downwardly on shaft 9 during transmission of torque thereto. This downward movement, through the annular flange 44 on driven gear 38, disengages the clutch between driving member 30 and shaft 7.

The modification of Figs. 6–9 differs primarily with respect to the construction of the braking means for shaft 9. As clearly shown in these figures, the driven gear 38 has formed thereon an upstanding annular flange 53, this flange forming a brake drum. Encircling the brake drum is a compression brake band 54 with friction material or brake band lining material 55 compressed therebetween. Extending outwardly from brake band 54 is an operating tab 56. This brake band assembly is held in place on gear 38 by means of an appropriate spring retainer ring 57.

During transmission of torque through the drive gearing to gear 38 and shaft 9, the components occupy the position shown in Fig. 7, with gear 38 in its lowermost position, further axial motion being arrested by bearing washer 43 in contact with drive pin 32. As clearly shown, the brake band 54 and tab 56 is free to rotate with gear 38, and hence no braking force is provided. However, it also may be noted that positioned in alignment with the outwardly projecting brake tab 56 is a downwardly projecting pin 58 anchored in the stationary casing section 1. Thus, when torque transmission from input shaft 4 is terminated, the inertia of the components connected to driving shaft 9 results in it becoming the driving member or source, whereupon the gear 38 tends to rise on its inclined spline. As soon as gear 38 rises to the position shown in Fig. 6, the brake tab 56 is arrested in its rotary motion by the stop pin 58, whereupon the brake retards further rotation of gear 38 and shaft 9.

After rotation of tube 9 is stopped by this brake, and input rotation is reversed for drive of inner shaft 7, it may be desired to snub tube 9 to prevent its rotation. For example, in a washing machine application, it is usually desirable to maintain the spin basket stationary during agitation. However, it is found in practice during drive to the inner shaft that spiral driven gear 38 tends to rotate in the opposite direction due to frictional drag effects, and thus tends to move downwardly. This downward movement of gear 38 and the brake band tends to disengage tab 56 from pin 58. To prevent this action, it is preferred to form pin 58 with a flat 59 on one side shaped to receive the outer end of brake tab 56 and with a shoulder 60 to prevent the brake tab from moving downward to a disengaged position, as shown by Figs. 10 and 11. Thus rotation of tube 9 may be restrained during drive to shaft 7. Since power drive to tube 9 is in the opposite direction of rotation, the brake tab is immediately disengaged from pin 58 so that spiral driven gear 38 may move downwardly as previously described.

In operation, the embodiment of Figs. 6–9 is very similar to the previously described arrangement. The selection of the output shaft which is rotated is determined by the direction of input rotation at shaft 4. However, whenever drive to the high speed shaft 9 is terminated, the brake automatically becomes effective, in this case by the outwardly projecting tab on the rotating brake band coming into engagement with a stationary stop on the casing. Again, the components can be so arranged that the brake is self-energizing, in the sense that it compresses the brake lining more tightly as the braking force increases. Furthermore, the brake tab and stop pin are provided with cooperating engaging portions to render the brake continuously effective during drive to inner shaft 7.

In both arrangements, a transmission is provided by which a drive may be accomplished selectively to one of two output shafts, and with a completely automatic brake effective to terminate rotation of one output shaft responsive to the direction of torque transmission through the driving member connected with that shaft.

While this invention has been described by reference to particular embodiments thereof, it is to be understood that numerous modifications may be made by those skilled in the art without actually departing from the invention. It is therefore the aim of the appended claims to cover all such equivalent variations as come within the true spirit and scope of the foregoing disclosure.

What I claim as new and desire to secure by Letters Patent of the United States is:

1. In an automatic transmission an input shaft, an output shaft, a casing in which said shafts are journaled, drive means between said input and output shafts including a driving member spirally splined on said output shaft providing limited axial movement in a first direction responsive to driving torque and a corresponding axial movement in the opposite direction upon termination of driving torque, a compression brake band encircling a portion of said driving member with an outwardly extending tab thereon, a cooperating stop on said casing engageable with said outwardly projecting tab when said driving member moves axially on the output shaft in said opposite direction.

2. In an automatic transmission an input shaft, an output shaft, a casing in which said shafts are journaled, drive means between said input and output shafts including a driving member spirally splined on said output shaft providing limited axial movement in a first direction responsive to driving torque and a corresponding axial movement in the opposite direction upon termination of driving torque, a compression brake band encircling a portion of said casing with an outwardly extending tab thereon, a cooperating lug on said driving member engageable with said outwardly projecting tab when said driving member moves axially on the output shaft in said opposite direction, a conical braking surface on said driving member, and a mating conical brake surface on said casing engaged by movement of said driving member on said spiral spline responsive to the engagement of said brake tab and cooperating lug.

3. In an automatic transmission, an input shaft, an output shaft, a casing in which said shafts are journaled, drive means between said input and output shafts including a driving member on said output shaft having a torsional connection therewith providing limited axial movement in a first direction upon transmission of driving torque to said output shaft and in the opposite direction upon termination of input drive, means defining a band brake between said driving member and said casing rendered effective upon axial movement in said opposite direction, a conical braking surface on said casing and a mating conical braking surface on said driving member, said conical braking surfaces being brought into engagement by axial movement in said opposite direction responsive to engagement of said band brake.

4. In an automatic transmission, an input shaft, an output shaft, a casing in which said shafts are journaled, drive means between said input and output shafts including a driving member on said output shaft having a torsional connection therewith providing limited axial movement in a first direction upon transmission of driving torque to said output shaft and in the opposite direction upon termination of input drive, means defining a band brake between said driving member and said casing rendered effective for a braking force upon initial axial movement of said driving member in said opposite direction, said braking force resulting in further movement of said driving member in said opposite direction, and means defining additional mating braking surfaces between said driving member and said casing engaged upon further movement of said driving member in said opposite direction.

5. In an automatic transmission, an input shaft, an output shaft, a casing in which said shafts are journaled, drive means between said input and output shafts including a driving member on said output shaft having a torsional connection therewith providing limited axial movement in a first direction upon transmission of driving torque to said output shaft and in the opposite direction upon termination of input drive, and means defining a band brake between said driving member and said casing including a brake tab and stop pin, said tab and stop pin engaging to render said brake effective upon axial movement of said driving member in said opposite direction.

6. In an automatic transmission, an input shaft, an output shaft, a casing in which said shafts are journaled, drive means between said input and output shafts including a driving member on said output shaft having a torsional connection therewith providing limited axial movement in a first direction upon transmission of driving torque to said output shaft and in the opposite direction upon termination of input drive, means defining a band brake between said driving member and said casing including a brake tab and stop pin, said tab and stop pin engaging to render said brake effective upon axial movement of said driving member in said opposite direction, and engaging surfaces on said tab and pin limiting axial movement of said driving member in said first direction until relative rotational direction of said driving member reverses for transmission of torque to said output shaft.

7. In an automatic transmission, a reversible input power shaft, co-axial output shafts journaled with respect to each other, a casing in which said shafts are journaled, means driving one of said output shafts from said input shaft with an oscillatory motion upon input rotation in a first direction, means defining a snubber to limit rotation of said other output shaft during oscillatory transmission, drive means between said input shaft and said other output shaft effective upon opposite direction of input rotation and including a driving member on said other output shaft having a torsional connection therewith providing limited axial displacement in a first direction upon transmission of driving torque, said snubber means being thereby disengaged, and braking means between said casing and said other output shaft to retard rotation upon termination of torque transmission through said driving member, said braking means being engaged by axial movement of said driving member in said opposite direction.

References Cited in the file of this patent

UNITED STATES PATENTS 2,372,026     Smith _____ Mar. 20, 1954